May 15, 1934.  R. R. CHAPPELL ET AL  1,958,909
WIND DIRECTION RECORDER
Filed April 13, 1931

INVENTORS
Ralph R. Chappell.
Robert J. Streb.
William G. Boettinger.
BY F. B. Smith
ATTORNEY Patented May 15, 1934

1,958,909

UNITED STATES PATENT OFFICE 1,958,909

WIND DIRECTION RECORDER

Ralph R. Chappell, Richmond, Va., Robert J. Streb and William G. Boettinger, Baltimore, Md., assignors to Julien P. Friez & Sons, Inc., Baltimore, Md., a corporation of Maryland Application April 13, 1931, Serial No. 529,810

15 Claims. (Cl. 234—7)

The present invention relates to means for recording the angular positions of a rotatable member.

One of the objects of the invention is to provide novel means for continuously recording the angular motion of a rotatable member at a point remote from said rotatable member.

Another object is to provide novel means for recording the direction of the wind at a point remote from the station at which the wind forces are acting.

Another object is to provide in a recording device, novel means whereby the angular positions of a rotatable member, as for example a wind vane, which may make any number of complete revolutions, may be plotted in rectangular coordinates on a chart.

A further object is to provide in combination with a wind vane, novel means whereby the angular motion of the vane may be employed to actuate a recording pen at a remote point so that the pen is imparted rectilinear motion over a chart moving at right angles to the motion of the pen.

A still further object is to provide in a recording mechanism wherein the angular motion of a rotatable member is employed to impart rectilinear motion to a recording pen over a chart moving at right angles to the motion of the pen, novel means whereby the pen is prevented from running off the chart when the rotatable member has made more than one complete revolution.

Another object is to provide a novel wind direction recording mechanism embodying a drive including a rack and pinion for translating angular motion of a wind vane into rectilinear motion of a recording pen, and means whereby overrunning of the rack relative to the pinion is prevented irrespective of the number of revolutions the wind vane may make.

Another object is to provide in a wind direction recording mechanism embodying a rack and pinion drive, novel means whereby the rack is caused to move in a reverse direction when it has reached the limit of its travel at either end thereof, without causing a reversal of the wind vane.

A further object is to provide in a device of the class described, novel means for causing the pen to be moved in a reverse direction when it has reached the limit of its travel in either direction and including means whereby the wind vane remains relatively stationary while the pen is reversing.

Another object is to provide in a device of the class described embodying a rack and pinion drive, means for causing the rack to be driven in a reverse direction by the pinion when the rack has reached the limit of its travel at either end thereof, and novel means for preventing reverse rotation of the wind vane by the reverse rotation of the pinion.

Still another object of the invention is to provide in a wind direction recording mechanism of the above type, novel means for producing a continuous trace of the recording pen on the chart for more than one revolution of the wind vane without causing the latter to retrace its movements.

A still further object is to provide in a wind direction recording mechanism of the above type, a chart arranged and marked for one and one-half revolutions of the wind vane and having two or more sets or pairs of like indicating marks thereon, one of one set of indicating marks being on one edge of the chart and one of another set being on the other edge of the chart, and the remaining marks being on the inside of the edges of the chart, and novel means whereby the recording pen may be shifted from either one of the edge indications to its corresponding indication on the inside of the edges of the chart when the pen, in its travels, reaches either edge so as to provide a continuous trace or curve.

Other objects and advantages of the invention will be more fully apparent from a consideration of the detailed description which follows, taken together with the accompanying drawing, wherein is illustrated one embodiment of the invention.

Figure 1:
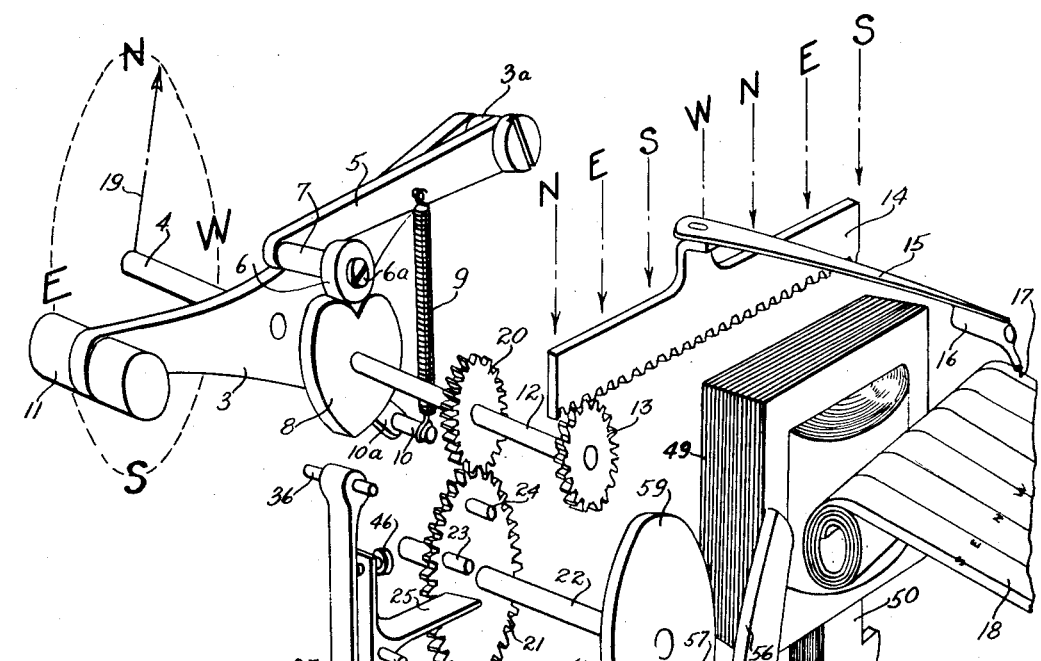
Fig. 1 is a perspective view, more or less diagrammatic, of one form of wind direction recording mechanism embodying the present invention.

Referring to the drawing, the wind direction recording mechanism embodying the present invention, is of the type wherein means are provided for employing the angular motion of a wind vane which may be located at a point remote from the mechanism, to impart rectilinear motion to a recording pen arranged to traverse a chart moving at a predetermined speed at right angles to the motion of the pen, whereby the direction of the wind may be plotted on the chart in rectangular coordinates. In the form shown, said means comprise a spider 3 which is connected to and rotatable with a shaft 4, the latter being connected to the vane shaft when the mechanism is operated directly by the wind vane, or, for example, to a shaft of a "Selsyn" motor (not shown) which is energized from a transmitter actuated by a wind vane located at a remote point. An arm 5 is pivotally connected at one end thereof to the spider 3, as indicated at 3a, and carries a roller 6 journaled on a stub shaft 7 secured to the arm 5 at the other end of the latter which is opposite to the pivotal connection and held on said shaft by any suitable means as, for example, a retaining screw 6a. The roller 6 is arranged to engage a heart-shaped cam 8 intermediate the two lobes of the heart, and is maintained in engagement with the cam 8 by means of a coil spring 9 secured to the arm 5 intermediate its ends and to a pin 10 which projects from an arm 10a formed integral with, or secured to, the spider 3. The purpose of the heart-shaped cam 8 and the roller 6, together with the pivotally connected arm 5, will be apparent more fully hereinafter.

A counterweight 11 is provided to maintain a balance between the spider 3 and the arm 5 and to assist in keeping the shaft 4 stationary when there is relative motion between cam 8 and the latter is actuated independently of the spider 3. The coil spring 9 is adapted to return the arm 5 and the roller 6 to normal position after the arm has been raised by the high points of the cam, as will appear more fully hereinafter. The cam 8 is secured to, or formed integrally with, a drive shaft 12, one end of which carries a driving pinion 13. The pinion 13 is arranged to mesh and drive a rack 14 to which is secured a recording pen 15. The recording pen is provided with the usual ink reservoir 16, and a point 17 of the pen is arranged to traverse a chart 18 when the rack is actuated by the driving pinion.

The chart is arranged to be moved under the pen at a definite fixed rate in a direction at right angles to the motion of the pen by some suitable timing device (not shown) as, for example, a clock-operated mechanism or by a synchronous motor of the type generally employed in electric clocks. The direction lines on the chart (Fig. 2) are arranged to run lengthwise of the chart, that is, parallel to the direction of motion thereof, and are lettered N, E, S, W, N, E, S, respectively, so as to provide for one and one-half revolutions of the wind vane. The lines indicating the times at which the wind's direction is recorded, are arranged to run transversely of the chart, that is, at right angles to the direction lines, and are numbered to represent the 24 hours of the day.

It will be seen that when the vane, which is illustrated diagrammatically by the dot-dash arrow 19, rotates, the shaft 4 is caused to rotate either by a direct connection with the vane or through the action of the "Selsyn" motor hereinbefore mentioned. As the shaft 4 rotates, the spider 3 is also caused to rotate, thereby carrying with it the arm 5 and the roller 6, the latter of which causes rotation of the drive shaft 12 by virtue of its engagement with the heart-shaped cam 8. The rotation of the shaft 12 is then translated into rectilinear motion by means of the driving pinion 13 and the rack 14. The length of the rack is such that one and one-half revolutions of the shaft 4 and consequently of the pinion 13, will cause the recording pen 15 to traverse the chart from one edge to the other and the rack is so positioned that when the vane is in the north position, for example, the rack 14 will be at the end of its motion in one direction and when the vane is rotated one and one-half revolutions, and consequently is in the south position, the rack will be at the limit of its travel in the opposite direction.

Figure 2:
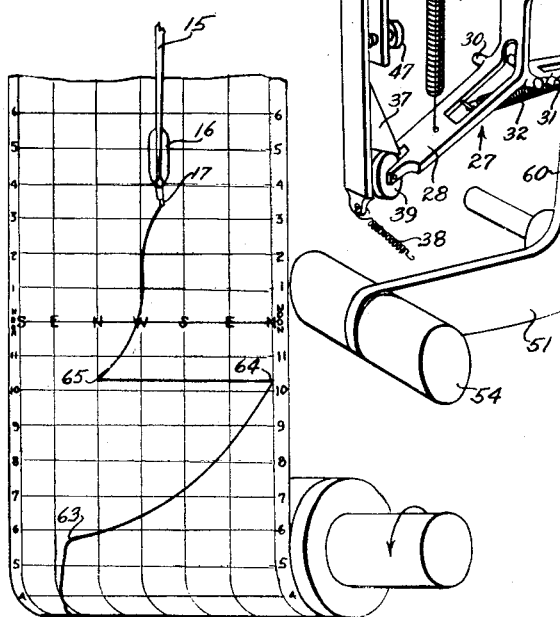
Fig. 2 illustrates a portion of the chart employed with the novel recording mechanism shown in Fig. 1, indicating how a continuous trace of the pen is made thereon when the wind vane has made more than one complete revolution.

It will be apparent from the foregoing that when the vane starts, for instance, from the north position and again reaches the north point, some function must take place to cause the pen to return to its starting point, i. e., when a chart such as is shown in Fig. 2 is employed, there is a shift of 360 degrees of position on the chart when the pen, in its travels, reaches either edge of the chart. For example, if the pen tried to run off the chart at the north edge, some function is required to be performed whereby the pen will be shifted to the mark "N" which lies between marks "W" and "E". For purposes of explanation this latter "N" mark will be referred to as the "internal" north position, while the "N" mark at the edge of the chart will be referred to as the "external" position. Similarly, when the vane drives the pen to the "south" edge of the chart, the pen must be shifted from the external position to the internal "S" mark on the chart between the marks "E" and "W". The wind direction may vary about these internal positions without necessitating the shift of the pen until an extremely great change in wind direction again forces the pen to either of the outside edges of the chart.

In earlier recorders of this type, the recording pen was generally driven by a cylindrical cam in the surface of which was milled a spiral groove. The pen was operated by a roller running in said groove and slots were milled connecting the points on this grooved track at which transfers from external to internal positions occurred. Suitable shift levers were provided which were driven by springs and controlled by cams to raise the pen through the slots, and the action of gravity was employed to drop the pen when the motion was downward. The operation of mechanisms of this type, however, was not sufficiently smooth to permit such operation to be controlled from a remote point as, for example, by means of a "Selsyn" motor controlled by the wind vane. Such mechanisms operated satisfactorily only when the cam was driven directly by the vane through a rigid mechanical linkage.

Later, recorders were developed which were adapted to be operated by "Selsyn" motors, and a cylindrical cam of the type referred to above was also employed to drive the pen, but electrically operated shifting arms were provided to transfer the pen roller through the slots in the cam. This was done in an attempt to relieve the "Selsyn" motor of some of the driving torque. In practise, however, it was found that there was a tendency to drop the pen into the cut-off slot as the vane yawed about a transfer point, even though no transfer was to be made. Such an arrangement caused the pen roller to hang up the rotation of the cam unless the roller were sufficiently guided across the open end of the slot in the spiral groove. In order to avoid this difficulty, the electrical shifting mechanism had to be called into play to guide the roller past this point. It is obvious, therefore, that the shifting mechanism was called upon to function as a safety device as well as a shifting device, with the result that it was practically in continuous operation. An arrangement of this type caused so many breakdowns as to render the device unreliable and practically useless.

The novel pen shifting means of the present invention is simple, reliable, highly efficient in operation, and arranged so that the recording pen is shifted only at such times as it is intended, that is, when the pen leaves either edge of the chart and the rack tends to run off the driving pinion. Said means comprises an arrangement of elements whereby the rack 14 is moved in a reverse direction when the rack has reached either the external north or the external south limits of its travel, so that the pen 15 may be shifted to either the internal north or internal south position.

In the embodiment illustrated, the arrangement comprises an electro-mechanically operated mechanism which includes a pinion 20 carried by and rotatable with the drive shaft 12 and positioned intermediate the heart-shaped cam 8 and the driving pinion 13. The pinion 20 is arranged to mesh with a gear 21 carried by or formed integral with a counter-shaft 22 which may be journaled in the frame of the entire mechanism in any suitable manner (not shown). Laterally projecting pins 23 and 24 are provided on the gear 21 and spaced circumferentially on one side thereof in such a manner that when the rack 14 has reached the end of its travel in one direction as, for example, the north end shown in the drawing, and the gear 21 has been rotated counter-clockwise by the clockwise rotation of the shaft 12, the pin 23 will be caused to engage or actuate a trigger 25 pivotally mounted on a rock-shaft 26. Similarly, when the rack has reached the end of its travel in the opposite direction, the pin 24 will be caused to engage and actuate the trigger 25 from the under side of the latter.

Means are now provided for closing an electrical circuit upon the actuation of the trigger 25 by either of the pins 23 and 24, respectively, whereby the gear 21 is rotated in the opposite direction to effect the shift of the rack 14, and consequently the recording pin 15, from either of the external positions to the respective internal positions, and to reset the trigger and its associated mechanism for another cycle of operation. Said means include a toggle 27 having extending arms 28 and 29 each of which is pivotally mounted as by means of pivot shafts 30 and 31 respectively. A coil spring 32 is provided for holding the toggle arms in angular relation, and is secured to said arms. A locking or latching means is provided for locking the toggle arm 28 when the latter is placed under tension by means of a spring 33 one end of which is secured to the arm 28 and the other end of which is fixed to a pin 34, and comprises a lever 35 pivotally mounted at one end on a rock-shaft 36 so that said lever may swing thereabout, for example, to the left and right as viewed in Fig. 1, and having a triangular projecting block 37 at the other end. The lever 35 is arranged to be normally held in locked position with the toggle arm 28 by means of a spring 38 which normally holds the lever 35 in such a position that the triangular block 37 engages a roller 39 which is rotatably mounted in the end of the toggle arm 28. The other toggle arm 29 is also provided with a roller 40 which is arranged to ride along the inclined face of another triangular block 41 carried by a spring contact arm 42 which is arranged to cooperate with a fixed contact arm 43 to close the electrical contacts 44 and 45 when the roller 40 is caused to ride upwardly along the inclined face of the block 41 by the action of the toggle. The toggle 27 provides a quick motion whereby the contacts 44 and 45 are opened and closed. The lever 35 is adapted to be actuated against the tension of the spring 38 to release the toggle arm 28 by means of the set screws 46 and 47 carried by a cross-arm 48 which is formed integral with and constitutes a part of the trigger 25.

The operation of the contacts 44 and 45 is arranged to close an electrical circuit (not shown) of a solenoid 49 to energize the latter, thereby causing the armature 50 to be drawn within the solenoid by magnetic attraction. The motion of the armature 50, caused by the magnetic attraction of the solenoid 49, is employed to rotate the gear 21 in the reverse direction, thereby causing the rack 14 to travel in a direction opposite to that caused by the rotation of the wind vane and hence moving the recording pen 15 from the edge of the chart to an internal position thereon, and also to reset the toggle 27 for the next cycle of operation. To this end, a bell-crank 51 is pivotally connected to the armature 50 by means of a link 52 and is arranged to rock on a shaft 53 when the armature 50 is attracted by solenoid 49. A counterweight 54 is provided at the end of the bell-crank opposite to the link 52 to normally maintain the bell-crank in equilibrium until such time as the armature 50 is actuated by the solenoid. A lever 55 is secured to the shaft 53 and rotatable therewith upon the actuation of the bell-crank and is provided with a cam face 56 which is caused to engage with either one of a pair of rollers 57 and 58. The rollers are carried by a disc 59 which is secured to, or formed integral with the counter shaft 22, to drive the latter. An arm 60 is carried by the bell-crank 51 and arranged so that upon actuation of the latter a set screw 61, carried by the arm, is caused to strike a projecting finger 62 which may be formed integral with the toggle arm 28 of the toggle 27, thereby causing the latter to be actuated to open the contacts 44 and 45 and to be reset for the next cycle of operation by the locking engagement of the lever 35 and the toggle arm 28.

Figure 3:
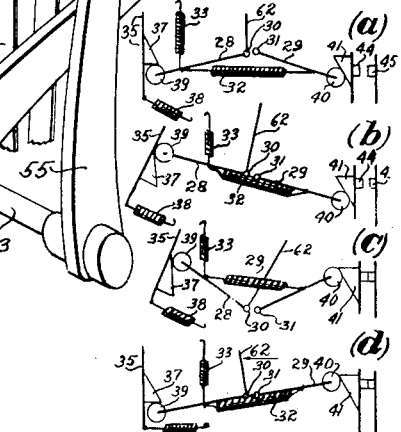
Fig. 3 is a diagrammatic illustration showing the sequence of actions of a portion of the mechanism embodying the present invention.

The operation of the toggle 27 may be more clearly understood from the diagrammatic illustrations in Fig. 3, wherein the toggle is shown in the various positions for one cycle of operation. In the position (a) the toggle arm 28 is in locked engagement with the lever 35 by means of the spring 38, and the spring 32 is at this time under slight tension tending to hold the toggle arm 29 in such a position that the roller 40 is at the lower end of the inclined face of the block 41 and the contacts 43 and 44 are open. The spring 33 at this time is under tension. The position of the toggle shown at (b)

is only instantaneous and occurs when the lever 35 has been moved to the left by either of the pins 23 or 24 striking the trigger 25 and upon such movement of the lever 35 against the tension of the spring 38, the spring 33 causes the toggle arm 28 to be moved upward, thereby placing the spring 32 temporarily under tension. However, as soon as spring 32 is placed under tension, the toggle arm 29 is caused to swing upward on its pivot and to assume the position shown in diagram (c) thereby causing the roller 40 to ride upward along the inclined face of the block 41 which in turn moves the contact arm 42 towards the contact arm 43 to close the contacts 44 and 45. The closing of the contacts causes the bell-crank to be actuated, thereby moving the arm 60 against projecting finger 62 of the toggle as indicated by the arrow in the diagram (d). Actuation of the finger 62 causes the lever 28 to move on its pivot, thereby bringing the roller 39 down along the inclined face of the block 37, and upon the roller 39 reaching the base of the block, the spring 38 pulls the lever 35 into locking engagement with the toggle arm 28. At this instant the spring 32 is again placed momentarily under tension, thereby causing the toggle arm 29 to move about its pivot and assume the normal position shown in diagram (a).

It is desirable, however, to prevent the reverse rotation of the drive shaft 12 from being transmitted back to the main shaft 4 and for this purpose, the heart shaped cam 8 with the roller 6, is employed. It will be apparent that as the pinion 20 is rotated by the gear 21 when the lever 55 is actuated, the main shaft 4 tends to remain in a fixed position due to the action of the wind on the vane, and the spider 3 and arm 5 are held in fixed relation relative to the cam 8. Cam 8 is now permitted to rotate relative to the arm 5 by means of the roller 6 until the roller has been lifted well beyond the high point of the cam, at which time the cam and roller interlinkage will actually assist for the remainder of the 360 degrees of rotation of the pinion 20 and the cam. The ratio between the pinion 13 and the rack 14 is such that for one revolution of the pinion, the rack may be moved from either of its ends, i. e., from the external north or south positions to the corresponding internal north and south positions, while the ratio between the pinion 20 and the gear 21 is such that the greater arc along the circumference of the gear 21 between the pins 23 and 24 is one and one-half times the circumference of the pinion 20, i. e., when the north end of the rack is about to run off the pinion, pin 24 will strike the trigger 25.

It will be apparent from the foregoing, that when the external north position is reached by the rack, the pin 23 will strike the trigger 25 and operate the latch 35 which releases the toggle 27. The spring 33 actuates the toggle to close the contacts 44 and 45 which energizes the solenoid 49. Energization of the latter operates the lever 55 through the bell-crank 51, which causes the face 56 to operate on the roller 57, driving the latter before it, and thus driving the shaft 22 on which the roller disc 59 is mounted in a direction opposite to that in which the vane was driving the shaft at the time when the transfer began. The driving of the shaft 22 causes the pinion 13 to rotate in a counter-clockwise direction through the gear transmission shown. The vane or motor shaft 4 remains practically fixed during the transfer, and the heart-shaped cam 8 rotates, while the spider 3 carrying the arm 5 in roller 6, remains fixed. The magnetic drive continues until the roller has been lifted well beyond the high point of the heart cam at which time the cam and roller interlinkage assists in the rotation of the pinion 13 for the remainder of the revolution of the pinion. As the bell-crank 51 is being operated, the arm 60 on the bell-crank is being actuated forward against the projecting finger 62 on the toggle. This operates to reset the toggle under the latch 35 and breaks the contacts 44 and 45. This latter operation should be so timed that the toggle is safely latched before the contacts are broken. The transfer will now be found to be complete, and while the vane or motor shaft is still in the position that caused the transfer, the pinion 13 is engaged with the teeth on the rack 14 which lie under the internal north mark rather than under the external or edge north mark on the chart.

The recording pen 15 is thus shifted from an external position on the chart to a corresponding internal position and can now move freely to or from the north position without causing further transfers, unless the oscillations of the vane be so great as to again cause the pen to travel to either edge of the chart. A similar transfer may be traced when the rack leaves the point at which the external south end is over the pinion 13, at which time the pin 24 acts on the trigger from the under side of the latter and the lever 55 acts on the roller 58, to give a counter-clockwise rotation.

The trace thus produced on the chart 18 is somewhat as indicated in Fig. 2. Assuming the pen to be initially at a point 63 between the east end and the internal north mark on the chart, at a time which is close to 6:00 A. M., and from 6:00 A. M. to 10:00 A. M. the wind shifts from north to east, south, east and at 10:00 A. M. is back to north again and continues to shift in a westerly direction, thereby moving the vane through more than 360 degrees or one revolution; the pen is then shifted from the external north position, shown at 64, to the internal north position, shown at 65, thereby leaving a continuous trace irrespective of the direction or motion of the wind vane.

There is thus provided a novel wind direction recording mechanism by means of which the angular position of the wind vane may be plotted in rectangular coordinates on a chart which is moving at right angles to the motion of the recording pen, the latter motion also being rectilinear.

Novel means are also provided for preventing the pen from running off the chart when the wind vane has made more than one complete revolution. It will be apparent from the novel arrangement of the various elements constituting the device that the operation of the latter is entirely automatic and the pen shifting mechanism is not caused to function unless the recording pen is actually being pushed off the chart, i. e., unless the rack 14 is actually ready to leave the driving pinion 13. The operation of the device is smooth and efficient and when a "Selsyn" motor is employed, does not exert an unduly large load on the latter.

What is claimed is:

1. Means for recording in rectangular coordinates the angular positions of a rotatable member on a chart, comprising in combination, a recording pen, means for translating angular movements of the rotatable member into rectilinear movements of said recording pen, a chart moving in a direction at right angles to the rectilinear movements of the recording pen, and means for shifting the pen from either edge of the chart to a correspondingly marked position inside of the edges of the chart when the rotatable member has traversed a predetermined angular distance.

2. Means for continuously recording the angular positions of a rotatable member, comprising a recorder, means for translating angular movements of the rotatable member into rectilinear movements of the recorder, means effective upon said rotatable member exceeding a predetermined angular travel for reversing the motion of the recorder when the latter has reached a predetermined limit of travel in either of two opposite directions, and means for preventing such reverse motion of the recorder from being transmitted back to the rotatable member.

3. Means for continuously recording the angular positions of a rotatable member, comprising a recorder, means for translating angular movements of the rotatable member into rectilinear movements of the recorder, and means operated by said rotatable member for reversing the motion of the recorder when the latter has reached a predetermined limit of travel in either of two opposite directions at which time the rotatable member remains relatively immovable with respect to the recorder.

4. In a wind direction recording device, the combination of a rotatable wind vane adapted to assume positions parallel to the direction of the wind, a recording pen, means for translating angular movements of the wind vane into rectilinear motion of said recording pen, a chart located at a point remote from said wind vane and moving in a direction at right angles to the rectilinear motion of the recording pen, whereby the pen is caused to trace a curve thereon, and means for shifting the pen from either edge of the chart to a correspondingly marked position inside of the edges of the chart when the wind vane has traversed a predetermined angular distance in one direction.

5. In a wind direction recording device, the combination of a wind vane, a recording pen located at a point remote from said wind vane, a drive including a rack and pinion for translating angular motion of the wind vane into rectilinear motion of the recording pen, and means for causing the rack to move in a reverse direction when it has reached the limit of its travel at either end thereof while preventing a reversal of the wind vane.

6. In a device for recording the angular positions of a rotatable member in rectangular coordinates on a chart, the combination with said rotatable member of a recording pen, means embodying a drive including a rack and pinion for translating angular movements of the rotatable member into rectilinear motion of said recording pen, a chart moving in a direction at right angles to the rectilinear motion of the recording pen, means for causing the rack to be driven in a reverse direction by the pinion when the rack has reached the limit of its travel at either end thereof, whereby the recording pen is shifted from either edge of the chart to a correspondingly marked position inside of the edges of the chart when the rotatable member has exceeded a predetermined angular distance of travel in one direction, and means for preventing reverse rotation of the rotatable member by the reverse rotation of the pinion.

7. In a device for recording the angular positions of a rotatable member, the combination with said rotatable member of a chart, a recording pen adapted to traverse said chart, and means for producing a continuous trace of the recording pen on the chart for more than one revolution of the rotatable member in the same direction while preventing the latter to retrace its movements.

8. In a device for recording the angular positions of a rotatable member in rectangular coordinates on a chart, the combination with said rotatable member of a recording pen, means for translating the angular movements of said rotatable member into rectilinear motion of said recording pen, a chart arranged to be traversed by the recording pen and moved at a predetermined speed at right angles to the motion of the recording pen, electrical means operative upon the recording pen reaching a predetermined limit of its travel in either of two opposite directions for reversing the motion of said recording pen whereby the latter is prevented from running off either edge of the chart when said rotatable member has exceeded a predetermined angular distance of travel in one direction, and means for preventing such reverse motion of the recording pen from being transmitted back to said rotatable member.

9. In a wind direction recording device, the combination with a wind vane of a recording pen, means embodying a drive including a rack and pinion for translating the angular movements of the wind vane into rectilinear motion of said recording pen, a chart arranged to be traversed by the recording pen and moving at a predetermined speed at right angles to the motion of the recording pen, means adapted to drive said pinion in a direction opposite to that in which said pinion is driven by the wind vane, whereby the recording pen is prevented from running off either edge of the chart when the wind vane has exceeded a predetermined angular distance of travel in the same direction, said reverse driving means including an electromagnetic device arranged to be energized when the rack reaches the end of its travel in either direction with respect to its driving pinion.

10. In a wind direction recording device, the combination with a wind vane of a recording pen, means embodying a drive including a rack and pinion for translating the angular movements of the wind vane into rectilinear motion of said recording pen, a chart arranged to be traversed by the recording pen and moving at a predetermined speed at right angles to the motion of the recording pen, means adapted to drive said pinion in a direction opposite to that in which said pinion is driven by the wind vane, whereby the recording pen is prevented from running off either edge of the chart when the wind vane has exceeded a predetermined angular distance of travel in the same direction, said reverse driving means including an electromagnetic device arranged to be energized upon the rack reaching the end of its travel in either direction with respect to its driving pinion, and means for preventing such reverse motion of the driving pinion from being transmitted back to the wind vane.

11. In a wind direction recording device, the combination with a wind vane adapted to assume positions parallel to the direction of the wind, of a recording pen, driving means including a rack and pinion for translating the angular movements of the wind vane into rectilinear motion of said recording pen, a chart arranged to be traversed by the recording pen and moving at a predetermined speed at right angles to the motion of the recording pen, means arranged to be actuated when the rack has reached the limit of its travel in either direction with respect to the pinion, electro-magnetic means adapted to be energized upon the actuation of said last mentioned means, and means operative upon the energization of said electro-magnetic means for driving the rack in a direction opposite to that in which it is driven by the wind vane, thereby preventing the recording pen from running off either edge of the chart when the wind vane has exceeded a predetermined angular distance of travel in one direction.

12. In a wind direction recording device, the combination with a wind vane adapted to assume positions parallel to the direction of the wind, of a recording pen, driving means including a rack and pinion for translating the angular movements of the wind vane into rectilinear motion of said recording pen, a chart arranged to be traversed by the recording pen and moving at a predetermined speed at right angles to the motion of the recording pen, means arranged to be actuated when the rack has reached the limit of its travel in either direction with respect to the pinion, electro-magnetic means adapted to be energized upon the actuation of said last mentioned means, means operative upon the energization of said electro-magnetic means for driving the pinion in a direction opposite to that in which it is driven by the wind vane, thereby preventing the recording pen from running off either edge of the chart when the wind vane has exceeded a predetermined angular distance of travel in one direction, and means for preventing reverse motion of the driving pinion from being transmitted back to the wind vane.

13. In a wind direction recording device, the combination with a wind vane adapted to assume positions parallel to the direction of the wind, of a recording pen, driving means including a rack and pinion for translating the angular movements of the wind vane into rectilinear motion of the recording pen, a chart arranged to be traversed by said recording pen and moving at a predetermined speed at right angles to the motion of said recording pen, means arranged to be actuated upon the rack reaching the end of its travel in either direction with respect to the pinion, electro-magnetic means adapted to be energized when said last mentioned means is actuated, means operative upon the energization of the said electro-magnetic means for driving the pinion in a direction opposite to that in which it is driven by the wind vane, whereby the recording pen is prevented from running off either edge of the chart when the wind vane has exceeded a predetermined angular distance of travel in one direction, and means effective upon the operation of said reverse driving means for causing the de-energization of said electro-magnetic means.

14. In a wind direction recording device, the combination with a wind vane adapted to assume positions parallel to the direction of the wind of a recording pen, driving means including a rack and pinion for translating the angular movements of the wind vane into rectilinear motion of the recording pen, a chart arranged to be traversed by said recording pen and moving at a predetermined speed at right angles to the motion of said recording pen, means arranged to be actuated upon the rack reaching the end of its travel in either direction with respect to the pinion, electro-magnetic means adapted to be energized when said last mentioned means is actuated, means operative upon the energization of the said electro-magnetic means for driving the pinion in a direction opposite to that in which it is driven by the wind vane, whereby the recording pen is prevented from running off either edge of the chart when the wind vane has exceeded a predetermined angular distance of travel in one direction, means effective during the operation of said reverse driving means for causing the de-energization of said electro-magnetic means, and means including a cam and roller drivably connected between the wind vane and the rack and pinion, said cam being drivably connected to the roller but adapted to be driven independently thereof for preventing the reverse motion of the driving pinion from being transmitted back to the wind vane.

15. In a wind direction recording device, the combination with a wind vane adapted to assume positions parallel to the direction of the wind, of a recording pen, means including a rack and pinion for translating the angular movements of the wind vane into rectilinear motion of the recording pen, a chart arranged to be traversed by the recording pen and moving at a predetermined speed at right angles to the motion of said recording pen, latching means normally locked but adapted to be actuated when the rack reaches the end of its travel in either direction with respect to the pinion, electro-magnetic means arranged to be energized upon the actuation of said latching means, means operative upon the energization of said electro-magnetic means for driving the pinion in a direction opposite to that in which it is driven by the wind vane, means effective during the operation of said reverse driving means for de-energizing said electro-magnetic means and resetting said latching means into normally locked position, and means including a one-way drive interposed between the wind vane and the driving pinion for preventing the reverse motion of said pinion from being transmitted back to the wind vane.

RALPH R. CHAPPELL.
          ROBERT J. STREB.
          WILLIAM G. BOETTINGER.